(12) United States Patent
Monteith

(10) Patent No.: US 11,608,857 B2
(45) Date of Patent: Mar. 21, 2023

(54) PASSIVE MAGNETIC BEARING

(71) Applicant: Robert Lothar Monteith, Bridgewater, MA (US)

(72) Inventor: Robert Lothar Monteith, Bridgewater, MA (US)

( * ) Notice: Subject to any disclaimer, the term of this patent is extended or adjusted under 35 U.S.C. 154(b) by 107 days.

(21) Appl. No.: 17/301,753

(22) Filed: Apr. 13, 2021

(65) Prior Publication Data

US 2021/0317873 A1 Oct. 14, 2021

Related U.S. Application Data

(60) Provisional application No. 63/009,866, filed on Apr. 14, 2020.

(51) Int. Cl.
| | |
|---|---|
| *F16C 32/04* | (2006.01) |
| *F03D 3/00* | (2006.01) |
| *F03D 3/06* | (2006.01) |
| *H02K 1/2793* | (2022.01) |
| *H02K 7/00* | (2006.01) |
| *H02K 16/02* | (2006.01) |
| *H02K 21/02* | (2006.01) |

(52) U.S. Cl.
CPC .......... *F16C 32/0412* (2013.01); *F03D 3/005* (2013.01); *F03D 3/061* (2013.01); *F03D 3/062* (2013.01); *H02K 1/2793* (2013.01); *H02K 7/003* (2013.01); *H02K 16/02* (2013.01); *H02K 21/028* (2013.01); *F05B 2240/213* (2013.01); *F05B 2250/14* (2013.01); *F05B 2250/241* (2013.01); *H02K 2213/09* (2013.01)

(58) Field of Classification Search
CPC ...... F16C 32/0412; F03D 3/005; F03D 3/061; F03D 3/062; F03D 9/25; H02K 1/2793; H02K 7/003; H02K 16/02; H02K 21/028; H02K 2213/09; F05B 2240/213; F05B 2250/14; F05B 2250/241; F05B 2220/7068; Y02E 10/72; Y02E 10/74
See application file for complete search history.

(56) References Cited

U.S. PATENT DOCUMENTS

| | | | | |
|---|---|---|---|---|
| 3,811,740 | A * | 5/1974 | Sacerdoti | F16C 32/0436 310/90.5 |
| 5,302,874 | A * | 4/1994 | Pinkerton | F16C 32/0436 310/90.5 |
| 2018/0259037 | A1 * | 9/2018 | Lavigno, IV | F16C 33/586 |
| 2018/0301947 | A1 * | 10/2018 | Tsai | H02K 15/02 |
| 2019/0006916 | A1 * | 1/2019 | Peterson | H02K 11/012 |

* cited by examiner

*Primary Examiner* — Tulsidas C Patel
*Assistant Examiner* — Viswanathan Subramanian

(57) ABSTRACT

A passive magnetic bearing employs eddy currents in a copper core between neodymium annular magnets to support the copper core and an associated rotating shaft. The copper core has an annular flange that is coaxial with a hollow cylinder. The hollow cylinder supports a rotating shaft. An annular iron core is coaxial with and surrounds the annular flange. Annular neodymium magnets surround the upper and lower portions of the hollow cylinder. In some embodiments a touch-down bearing is made up of an upper and a lower bearing race that are spaced away from the upper surface and lower surface of the annular flange. The core rotates over the bearing race(s) until sufficient magnetic flux is generated to support the copper core and hence the shaft. Once spinning, a magnetic field is generated in the copper core.

4 Claims, 5 Drawing Sheets

PASSIVE MAGNETIC BEARING

TECHNICAL FIELD

The present disclosure relates to passive magnetic bearings and to using such bearings to support a rotating shaft having a vertical axis of rotation.

BACKGROUND

Motor and generator armatures, flywheel rotors and other rotatable components are commonly supported against transverse and axial movement by mechanical bearings such as ball and roller bearings. Ball and roller bearings involve mechanical contact between bearing components and a rotating element resulting in frictional losses and wear.

Supporting a rotating shaft with a vertical axis of rotation requires a magnetic bearing that is both a rotational bearing and a thrust bearing.

SUMMARY

A passive magnetic bearing employs eddy currents in a copper core between neodymium annular magnets to support the copper core and an associated rotating shaft. The copper core has an annular flange that is coaxial with a hollow cylinder. The hollow cylinder supports a rotating shaft. An annular iron core is coaxial with and surrounds the annular flange. Annular neodymium magnets surround the upper and lower portions of the hollow cylinder. In some embodiments a touch-down bearing is made up of an upper and a lower bearing race that are spaced away from the upper surface and lower surface of the annular flange. The core rotates over the bearing race(s) until sufficient magnetic flux is generated to support the copper core and hence the shaft. Once spinning, a magnetic field is generated in the copper core. One skilled in the art understands that higher velocity rotations of the copper core generate greater magnetic flux. In some embodiments there is a groove in the lower surface of the annular flange that is aligned with and coaxial with the lower bearing race to guide the copper core when it rides on the lower bearing race.

DESCRIPTION

Figure 1:
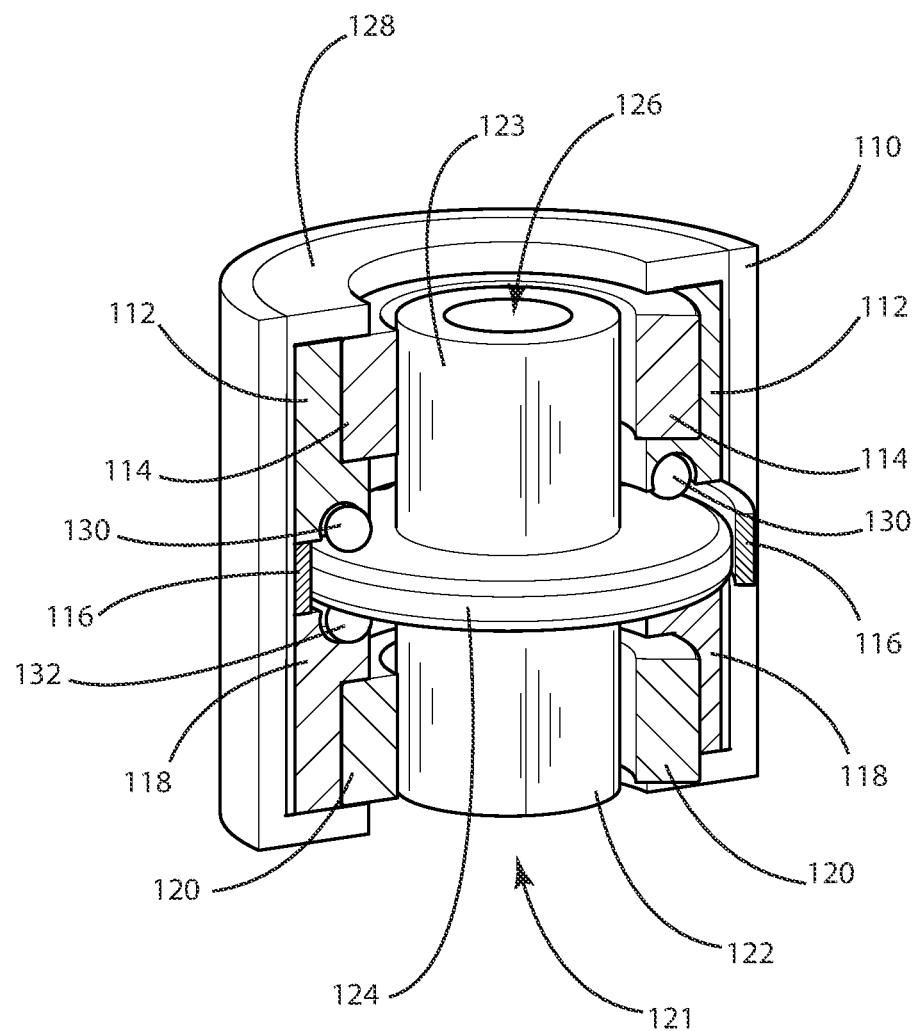
FIG. 1 is a front perspective, partial section view of an example embodiment.
Figure 2:
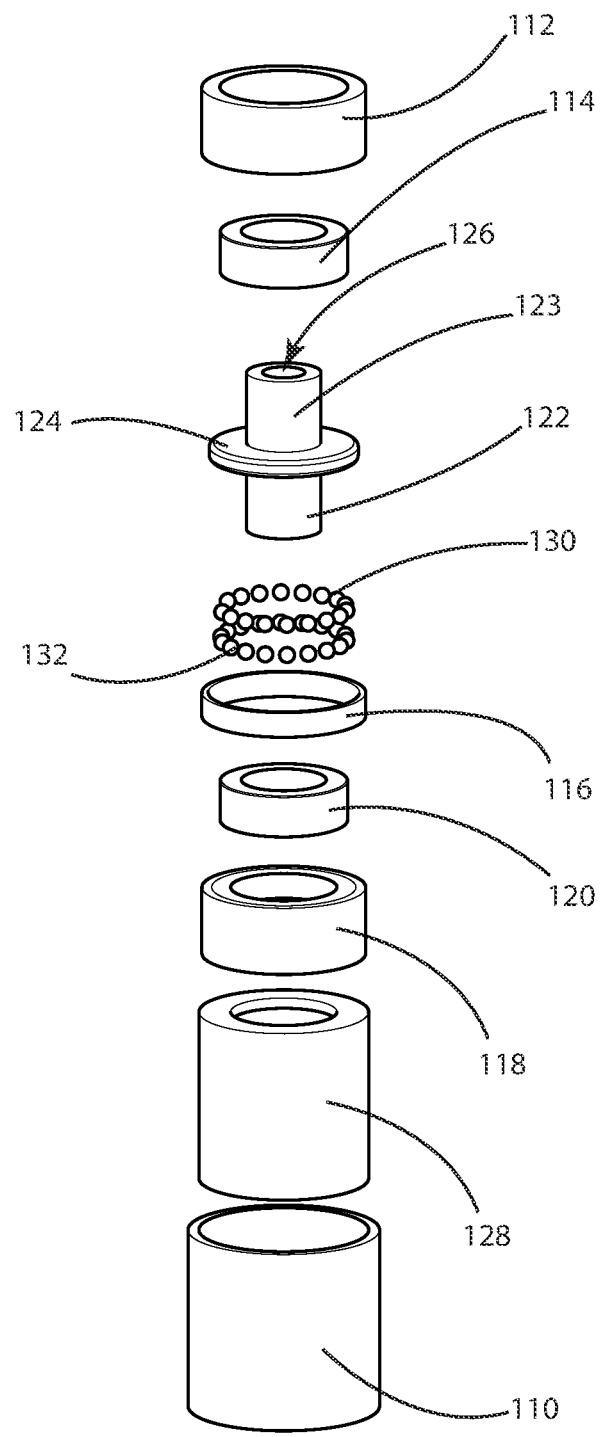
FIG. 2 is a perspective, exploded view of the embodiment.
Figure 3:
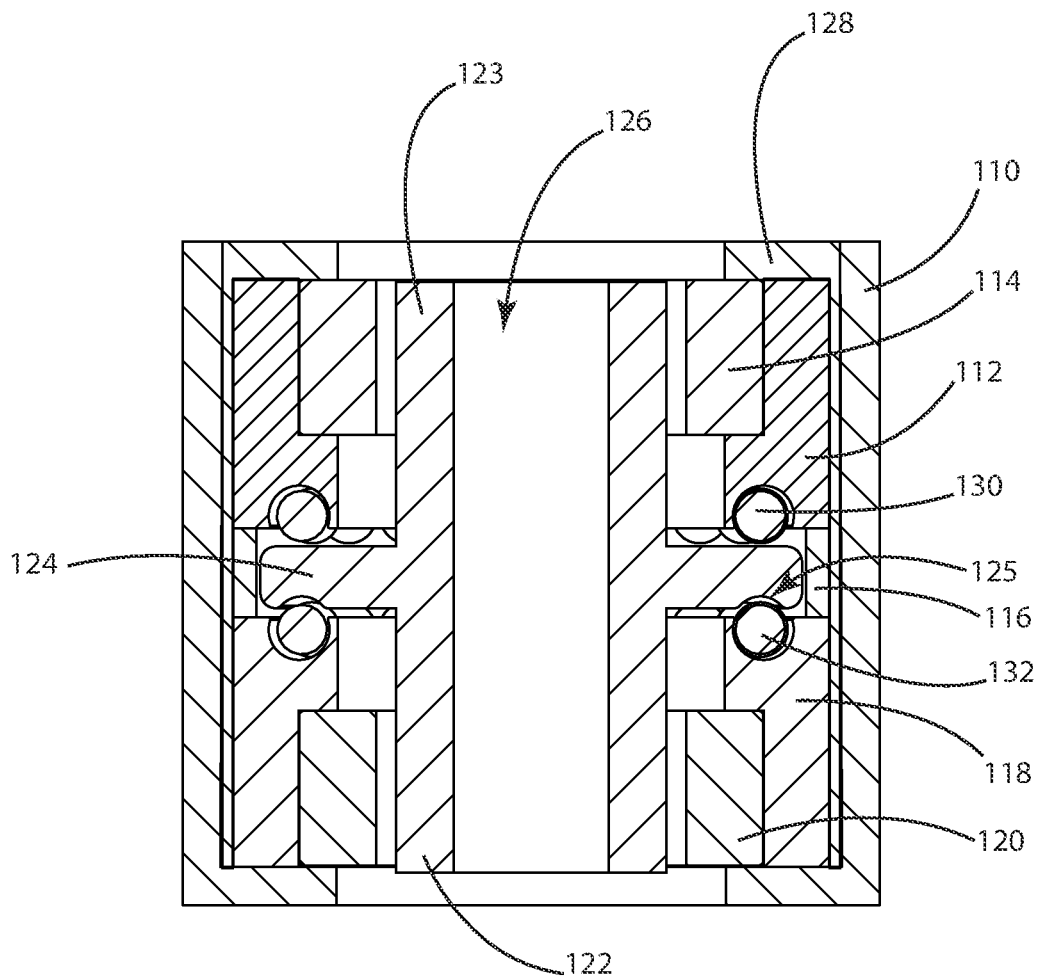
FIG. 3 is a section view of the embodiment.

In FIG. 1, a front perspective, partial section view depicts the components of an example embodiment of the disclosure. FIG. 2 is a perspective, exploded view and FIG. 3 is a section view of the embodiment. Referring to FIGS. 1, 2 and 3, an outer housing 110 contains a passive magnetic bearing. A non-ferrous, metal core 121 has an upper cylindrical form 123, a lower cylindrical form 124, an annular flange 124 and a hole through the center 126. In some embodiments the non-ferrous metal core is copper. The hole through the center accepts a rotatable shaft. An upper annular permanent magnet 114 is held in position by spacers 112. In some embodiments, the annular spacer 112 is aluminum. The annular spacer 112 houses an upper bearing race 130 that is spaced away from the annular flange 124 and functions as a touch-down bearing. The lower cylindrical form 120 is surrounded by a lower annular permanent magnet 120. In some embodiments the upper annular permanent magnet and lower permanent magnet are neodymium magnets. The lower annular permanent magnet 120 is held in place by an annular spacer 118. The annular spacer 118 houses a lower bearing race 132 that is spaced away from the non-ferrous metal core 121 and functions as a touch down bearing. The annular flange 124 has an annular groove 125 that supports and guides the lower bearing race 132 (FIG. 3). An iron core 116 surrounds the annular flange 124. A containment form 128 encapsulates the components in the outer housing 110.

Figure 4:
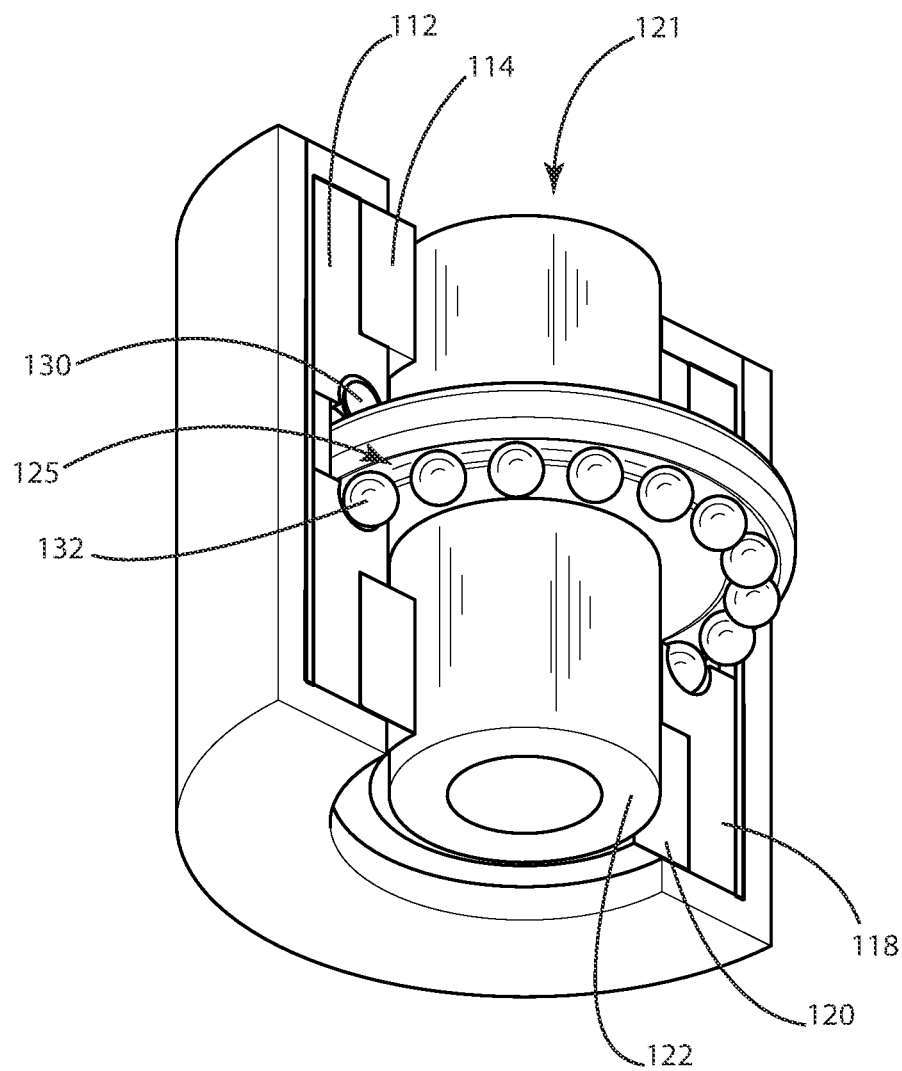
FIG. 4 is a bottom perspective, partial section view of the embodiment.

The illustration in FIG. 4 is a bottom perspective view showing the lower bearing race 132 in the annular groove 125. Touch-down bearing races 130 (FIG. 1) and 132 (FIG. 5) enable the rotation of the non-ferrous metal core 121 at low rpms until eddy currents support the non-ferrous metal core 121.

Figure 5:
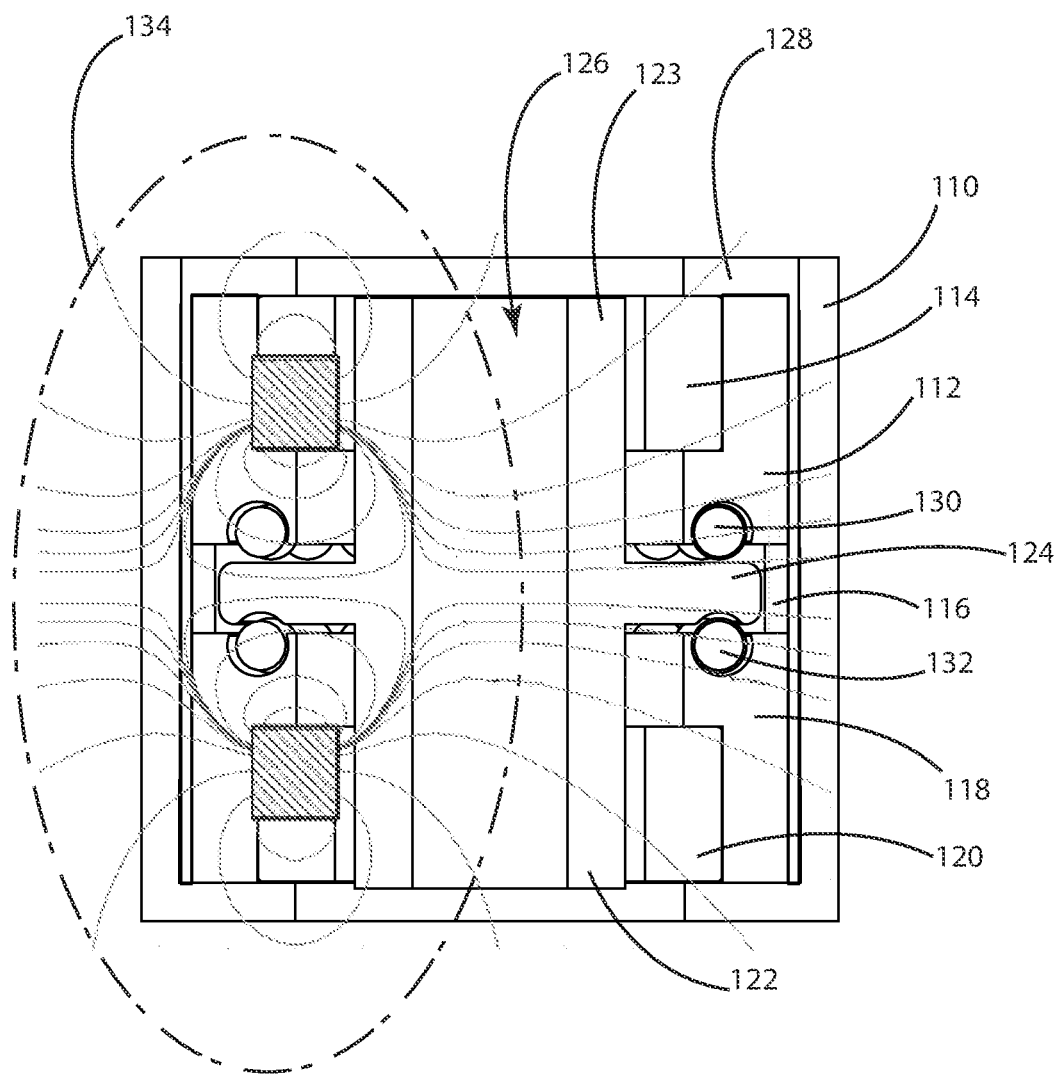
FIG. 5 is a section view of the embodiment.

In FIG. 5, a section view depicts the flow of eddy currents, in the area surrounded by dashed line 134, between the upper magnet 114, the lower magnet 120 and the iron ring 116 that suspend the annular flange 124. One skilled in the art understands that similar eddy currents occur in a mirror image to those shown.

These embodiments should not be construed as limiting.

The invention claimed is:

1. A passive magnetic bearing comprising:
   a non-ferrous metal core having a central axis that is coaxial with an upper cylindrical form, a lower cylindrical form and an annular flange;
   said annular flange having an upper surface and a lower surface; said lower surface having an annular groove coaxial with said central axis; and
   a hole through the center, coaxial with said central axis, configured to accept a rotatable shaft; and
   a first annular permanent magnet surrounding said upper cylindrical form proximal to said annular flange and held in position by a first non-ferrous spacer coaxial with said central axis; and
   a first bearing race housed in said first non-ferrous spacer proximal to and spaced away from said annular flange upper surface; and
   a second annular permanent magnet surrounding said lower cylindrical form proximal to said annular flange and held in position by a second non-ferrous spacer coaxial with said central axis; and
   a second bearing race housed in said second non-ferrous spacer coaxial with and spaced away from said annular flange annular groove in said lower surface; wherein said first and second bearing race align said non-ferrous metal core until sufficient rotations cause eddy currents in said first and second annular permanent magnets, in combination with said iron core, to support said annular flange away from and between said first and second bearing race to support said rotatable shaft as it rotates.

2. The passive magnetic bearing of claim 1 wherein said non-ferrous metal core is copper.

3. The passive magnetic bearing of claim 1 wherein said first and second non-ferrous spacers are aluminum.

4. The passive magnetic bearing of claim 1 wherein said first and second annular permanent magnet are neodymium.

* * * * *